United States Patent
Amano

(10) Patent No.: US 8,950,661 B2
(45) Date of Patent: Feb. 10, 2015

(54) REALIZING DESKTOP METAPHORS ON A COMPUTER

(71) Applicant: International Business Machines Corporation, Armonk, NY (US)

(72) Inventor: Tomio Amano, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/632,260

(22) Filed: Oct. 1, 2012

(65) Prior Publication Data

US 2014/0091134 A1     Apr. 3, 2014

(51) Int. Cl.
    *G06F 17/00*    (2006.01)
(52) U.S. Cl.
    USPC ............................................ 235/375; 235/380
(58) Field of Classification Search
    USPC .................. 235/375, 380, 383, 492, 486, 487
    See application file for complete search history.

(56) References Cited

U.S. PATENT DOCUMENTS

| | | | | |
|---|---|---|---|---|
| 7,454,086 B2 * | 11/2008 | Erol | ............................... | 382/284 |
| 7,886,978 B2 * | 2/2011 | Ofek et al. | .................. | 235/462.1 |
| 8,116,582 B2 * | 2/2012 | Erol | ............................... | 382/254 |
| 8,297,499 B2 * | 10/2012 | Tessier | ........................... | 235/380 |
| 8,496,180 B2 * | 7/2013 | Bahr et al. | ............... | 235/472.01 |
| 2014/0103110 A1 * | 4/2014 | Tessier | ........................... | 235/380 |

FOREIGN PATENT DOCUMENTS

| | | |
|---|---|---|
| JP | 7175587 A | 7/1995 |
| JP | 3555838 B9 | 11/1999 |
| JP | 2001109570 A | 4/2001 |
| JP | 2005174215 A | 6/2005 |
| JP | 2008250738 A | 10/2008 |
| JP | 2009042993 A | 2/2009 |

* cited by examiner

*Primary Examiner* — Thien M Le
(74) *Attorney, Agent, or Firm* — Law Offices of Ira D. Blecker, P.C.

(57) ABSTRACT

A desktop metaphor system. There is included a physical, non-virtual icon card corresponding to a certain computer application and a computer separate from the icon card. The computer includes a computer readable storage medium for storing computer applications, one of which is the certain computer application, and a computer processor. The computer processor includes an icon detection module to detect the approaching of the icon card to the computer and recognize the certain computer application corresponding to the icon card; an application context memory module for storing application context for an application running on the computer processor and for storing application context for the certain application corresponding to the icon card and stored in storage; and an event processing logic module for switching between the application, if any, currently running on the computer processor and the certain application corresponding to the icon card.

21 Claims, 5 Drawing Sheets

REALIZING DESKTOP METAPHORS ON A COMPUTER

BACKGROUND

The present exemplary embodiments relate to desktop metaphors on a computer and more particularly, relate to the use of an external icon card (a physical, non-virtual desktop metaphor) to cause a computer to switch from one application to another application.

A desktop metaphor, which treats the screen of a personal computer as if it is the top of a user's physical desk on which icons and windows representing tools, documents, etc. can be placed, is a useful and important concept that is employed in almost all computer systems. An operator using a device does a task while switching between applications such as a word-processor application and an electronic-calculator application on a virtual desktop. Specifically, the user repeats the following two types of operations to proceed with the task:
(1) The user inputs, edits, or acquires information while focusing their attention on a certain application at each moment of such inputting, editing, or acquisition; and
(2) The user selects an icon or a window that is displayed on the virtual desktop to switch the target of their focus over to another application.

Operations belonging to the type (1) constitute the essential part of the task. It is preferred that operations belonging to the type (2) should be carried out in the shortest possible time without making the user aware of the execution of this type of operation, that is, without interrupting the user's thoughts directed to essential operations for carrying out the task. Ideally, all of the windows of applications that are running should be arranged on a display screen so that a user can shift the target of their focus just with a single click of a pointing device.

However, when a user does a task using a sub-notebook computer or a tablet device, the user often experiences task interruption due to the switching of the type (2) and resultant interruption of thoughts. The reason for task interruption is as follows. In these smaller profile devices, it is considered that portability is important. Therefore, the screen size of these devices is small so that a single application may occupy the entire screen area. An extra switching operation is necessary in order to select the window or icon of a target application to which a user wants to run. For example, the user may have to move a window(s) that is not the window of the target application itself or change the size thereof. In another case, the user may have to launch a task management program to select the target application from a menu for switchover to the new (target) application.

BRIEF SUMMARY

The various advantages and purposes of the exemplary embodiments as described above and hereafter are achieved by providing, according to a first aspect of the exemplary embodiments, a desktop metaphor system comprising: a physical, non-virtual icon card corresponding to a certain computer application; and a computer separate from the icon card. The computer comprising: a non-transitory computer readable storage medium for storing a plurality of computer applications, one of which is the certain computer application; and a computer processor. The computer processor having: an icon detection module to detect the approaching of the icon card to the computer and recognize the certain computer application corresponding to the icon card; an application context memory module for storing application context for an application running on the computer processor and for storing application context for the certain application corresponding to the icon card and stored in storage; and an event processing logic module for switching between the application currently running on the computer processor and the certain application corresponding to the icon card.

According to a second aspect of the exemplary embodiments, there is provided a desktop metaphor system comprising: a computer having the capability to communicate with a physical, non-virtual icon card corresponding to a certain computer application and being separate from the computer. The computer comprising: a non-transitory computer readable storage medium for storing a plurality of computer applications, one of which is the certain computer application; and a computer processor. The computer processor having: an icon detection module to detect the approaching of the icon card to the computer and recognize the certain computer application corresponding to the icon card; an application context memory module for storing application context for an application running on the computer processor and for storing application context for the certain application corresponding to the icon card and stored in storage; and an event processing logic module for switching between the application currently running on the computer processor and the certain application corresponding to the icon card.

According to a third aspect of the exemplary embodiments, there is provided a method for realizing a desktop metaphor on a computer. The method comprising: providing a computer having an icon detection module, an application context memory module, an event processing logic module and a non-transitory computer storage medium; detecting by the icon detection module the approaching of an icon card to the computer, the icon card corresponding to a certain computer application stored in the non-transitory computer storage medium; recognizing the certain computer application corresponding to the icon card; directing by the event processing logic module the storing, in the application context memory module, of the application context with respect to an application running on the computer; directing by the event processing logic module the storing, in the application context memory module, of the application context with respect to the certain computer application corresponding to the icon card; and switching by the event processing logic between the application, if any, currently running on the computer and the certain application corresponding to the icon card and being stored in the non-transitory computer readable medium.

According to a fourth aspect of the exemplary embodiments, there is provided a computer program product for realizing a desktop metaphor on a computer, the computer program product comprising: a non-transitory computer readable storage medium having computer readable program code embodied therewith. The computer readable program code comprising: computer readable program code configured to provide an icon detection module, an application context memory module, an event processing logic module and a non-transitory computer storage medium; computer readable program code configured to detect by the icon detection module the approaching of an icon card to the computer, the icon card corresponding to a certain computer application stored in the non-transitory computer storage medium; computer readable program code configured to recognize the certain computer application corresponding to the icon card; computer readable program code configured to direct by the event processing logic module the storing, in the application context memory module, of the application context with respect to an application running on the computer; computer readable program code configured to direct by the event processing logic module the storing, in the application context memory module, of the application context with respect to the certain computer application corresponding to the icon card; and computer readable program code configured to switch by the event processing logic between the application, if any, currently running on the computer and the certain application corresponding to the icon card and being stored in the non-transitory computer readable medium.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
FIG. 1 is a typical (conventional) view of a physical desk having objects on the desk.

Referring to the Figures in more detail, and particularly referring to FIG. 1, there is illustrated a physical, non-virtual desk having physical, non-virtual objects on the desk such as books, calculator, calendar, clock, pad, etc. A person may change the target of his focus naturally and quite smoothly by repositioning himself (for example, turning in his chair) or by changing his posture to change his eye line, or by stretching out his hand onto the target of his focus and then bringing the target closer to him. However, the number of these objects that may be placed on the top of a desk at the same time may be limited.

Figure 2:
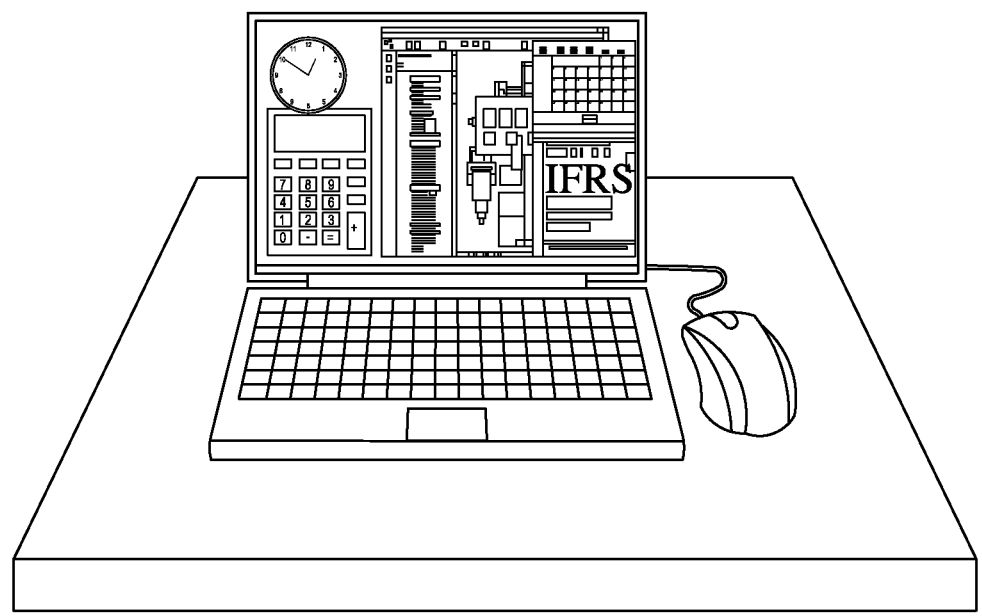
FIG. 2 is a typical (conventional) view of a desktop metaphor on the screen of a laptop computer.

FIG. 2 illustrates a desktop metaphor on a laptop computer which treats the computer monitor of a laptop computer as if it is the user's physical, non-virtual desktop, upon which objects such as books, calculator, clock, etc. may be placed. Icons and windows representing books, tools, etc. may be placed on a virtual desktop of the window system. There is literally no limitation in the number of them that may be placed on the desktop. However, because of the constraints of the physical size of a tablet device display, a switching operation that is necessary for switching to the next target of focus may interrupt the thoughts of a user, which may cause a decrease in working efficiency.

In the exemplary embodiments, "articles" that may exist as physical, non-virtual objects outside a person's computer or a tablet device (such as an iPad) but occupy far less space as compared with space occupied by actual tools, books, etc., may be used as icons that may represent applications that are to be launched and switched with one or more applications currently running. In one exemplary embodiment, cards may be used as these icons. Each of these icons may have a size that is, for example, approximately the same size as that of a credit card. These "articles" being of a physical, non-virtual nature may be hereinafter referred to as an "icon card".

It should be understood that the icon card only represents or corresponds to an application and the application itself resides on the personal computer or tablet device. As explained hereafter, the icon card may have a unique identification number or electronic circuitry to identify the icon card to the computer or tablet device but the application will reside on the computer or tablet device.

A user may place icon cards on a physical, non-virtual desk, that is, not on a personal computer or tablet desktop, in a random arrangement. When not in use, the user may keep the icon cards in a drawer or the like. The user may switch from one application to another by, for example, holding a tablet device over an icon card, placing an icon card over a tablet device, or moving an icon card to a position near a tablet device. The use of an icon card in conjunction with the tablet device is an alternative to switching over applications by clicking a screen icon placed on a screen (i.e., a virtual desktop) of the tablet device.

Figure 3:
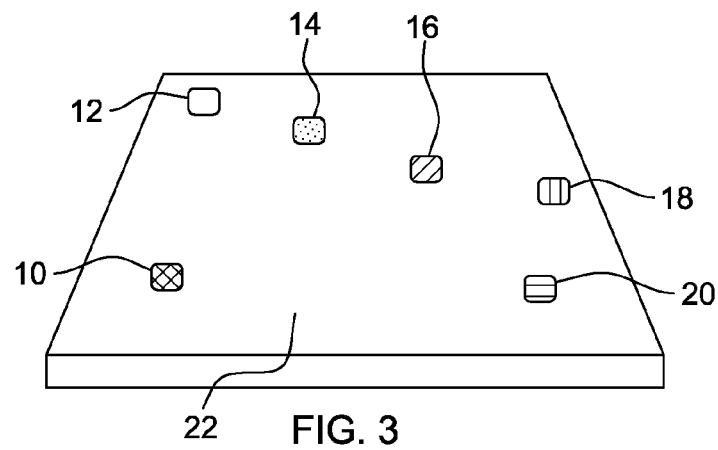
FIG. 3 is a physical desktop having icon cards for switching between applications.

In the exemplary embodiments, as illustrated in FIG. 3, a user may use physical, non-virtual icon cards that may be placed on the top of a physical, non-virtual desk 22. The user may arrange these icon cards in any manner, such as a random manner or organized manner, on the top of the desk in a layout.

Figure 4A:
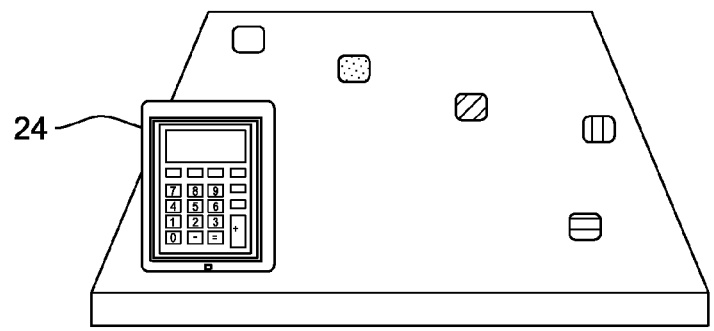
FIGS. 4A, 4B and 4C illustrate three instances of the use of icon cards to switch between applications.

FIG. 3 illustrates an exemplary embodiment in which each of these icon cards 10, 12, 14, 16, 18, 20 corresponds to a certain application. The icon cards 10, 12, 14, 16, 18, 20 may be arranged in a random manner as shown in FIG. 3. In one exemplary embodiment, when a user holds a tablet device over one icon card such that the tablet device and icon card overlap each other in a plan view, the content of display on the screen of the tablet device may switch over to an application that corresponds to this icon card. For example, the icon card 10 may correspond to an electronic calculator application although the actual electronic calculator application resides in the tablet device. When the user holds the tablet device 24 over the icon card 10 shown in FIG. 3, the content of display on the screen of the tablet device 24 switches over to an electronic calculator application as shown in FIG. 4A.

Figure 4B:
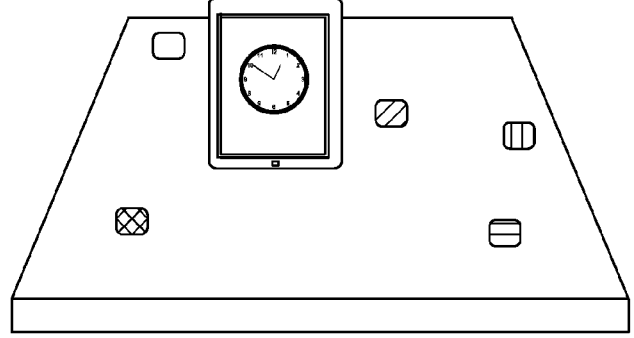

When the user moves the tablet device 24 to icon card 14, the content of display on the screen of the tablet device 24 switches over to a clock/alarm application as illustrated in FIG. 4B because the icon card 14 corresponds to a clock/alarm application. The actual clock/alarm application resides in the tablet device 24.

Figure 4C:
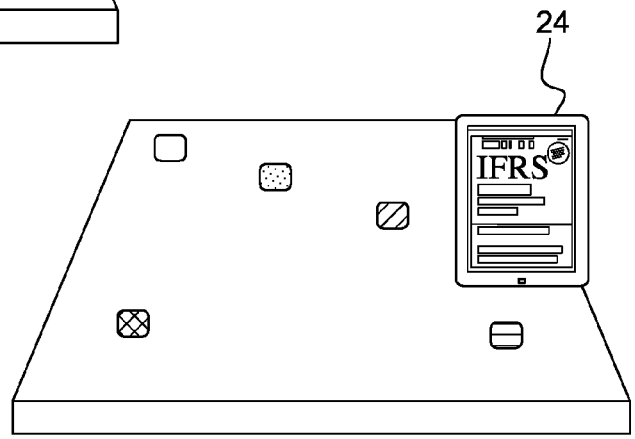

In a third example, the icon card 18 corresponds to an electronic-book-reader application so when the user holds the tablet device 24 over the icon card 18, the content of display on the screen of the tablet device 24 switches over to an electronic-book-reader application as shown in FIG. 4C. Again, the actual electronic-book-reader application resides in the tablet device 24.

In the examples discussed above, the icon cards 10, 12, 14, 16, 18, 20 serve as desktop metaphors, albeit on a physical, non-virtual desktop.

In the examples discussed with reference to FIGS. 4A, 4B, 4C, the user moved the tablet over the icon card. It is within the scope of the present invention for the user to move an icon card in proximity to the tablet device 24, such as near to the tablet device 24 or over the tablet device 24.

As seen in the examples illustrated in FIGS. 4A, 4B, 4C, in each screen display, a single application substantially occupies the entire screen area of the tablet device 24. Therefore, there is no space on the screen for displaying icons or a menu for switching from one application to another. With the present exemplary embodiments, you may switch from one application to another by intuitive operation as in non-virtual deskwork, such as repositioning yourself or stretching out your hand onto a book or a tool and then bringing it closer to you.

Figure 5:
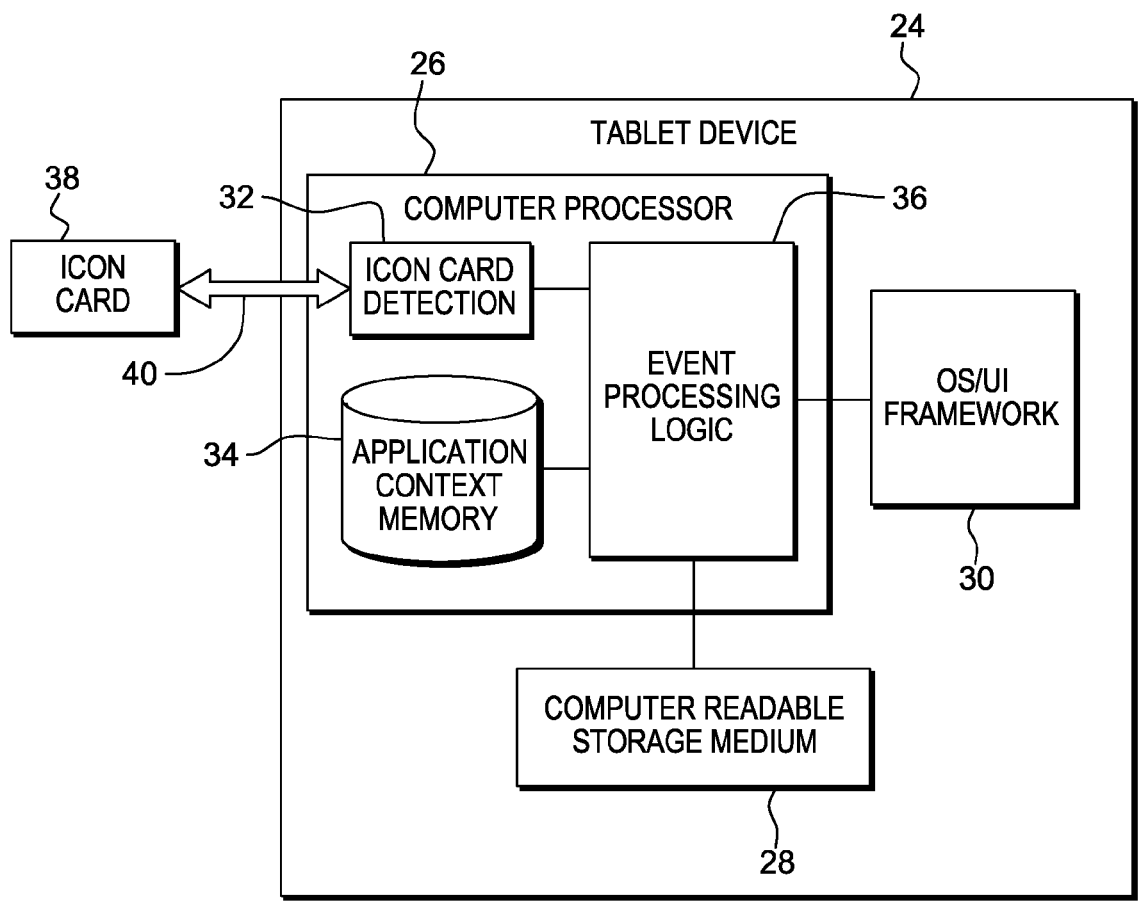
FIG. 5 is a first hardware environment for use in practicing the exemplary embodiments.

Referring now to FIG. 5, there is illustrated one exemplary hardware embodiment. Tablet device 24 includes a computer processor 26 and a tangible, non-transitory computer storage medium 28, for example, a hard drive, flash drive, USB drive, etc. Resident within the tablet device may be an operating system/user interface framework 30. In one exemplary embodiment, the computer processor 26 may further include an icon card detection module 32, an application context memory module 34 and an event processing logic module 36. Other arrangements of these components within tablet device 24 are within the scope of the present exemplary embodiments.

While a tablet device 24 is illustrated in FIG. 3, the exemplary embodiments may have applicability to any computer including but not limited to personal computers, laptop computers, notebook computers, netbooks and the like. However, the exemplary embodiments may have the most applicability to small computers such as tablets and sub-notebook computers.

Also shown in FIG. 5 is an icon card 38 that is separate from the tablet device 24. The icon card 38 is an external medium that is not included in the constituent elements of the tablet device 24. The icon card may have a thin body that will not occupy much space. For example, the icon card may have a shape resembling a credit card.

The icon detection module 32, through various methods discussed hereafter, detects 40 the approaching of the icon card 38 to the tablet device 24 and recognizes what application the icon card 38 represents by recognizing the shape of the icon card 38 or by other means as described hereafter.

The application context module 34 stores application context for an application running on the computer processor and for storing application context for the application corresponding to the icon card 38 and stored in the computer readable storage medium 28.

The event processing logic module 36 may direct the application context memory module 34 to store the application context for the application running on the computer processor and to store the application context for the application corresponding to the icon card 38. In addition, the event processing logic module 36 may switch between the application currently running on the computer processor and the application corresponding to the icon card 38.

Figure 6:
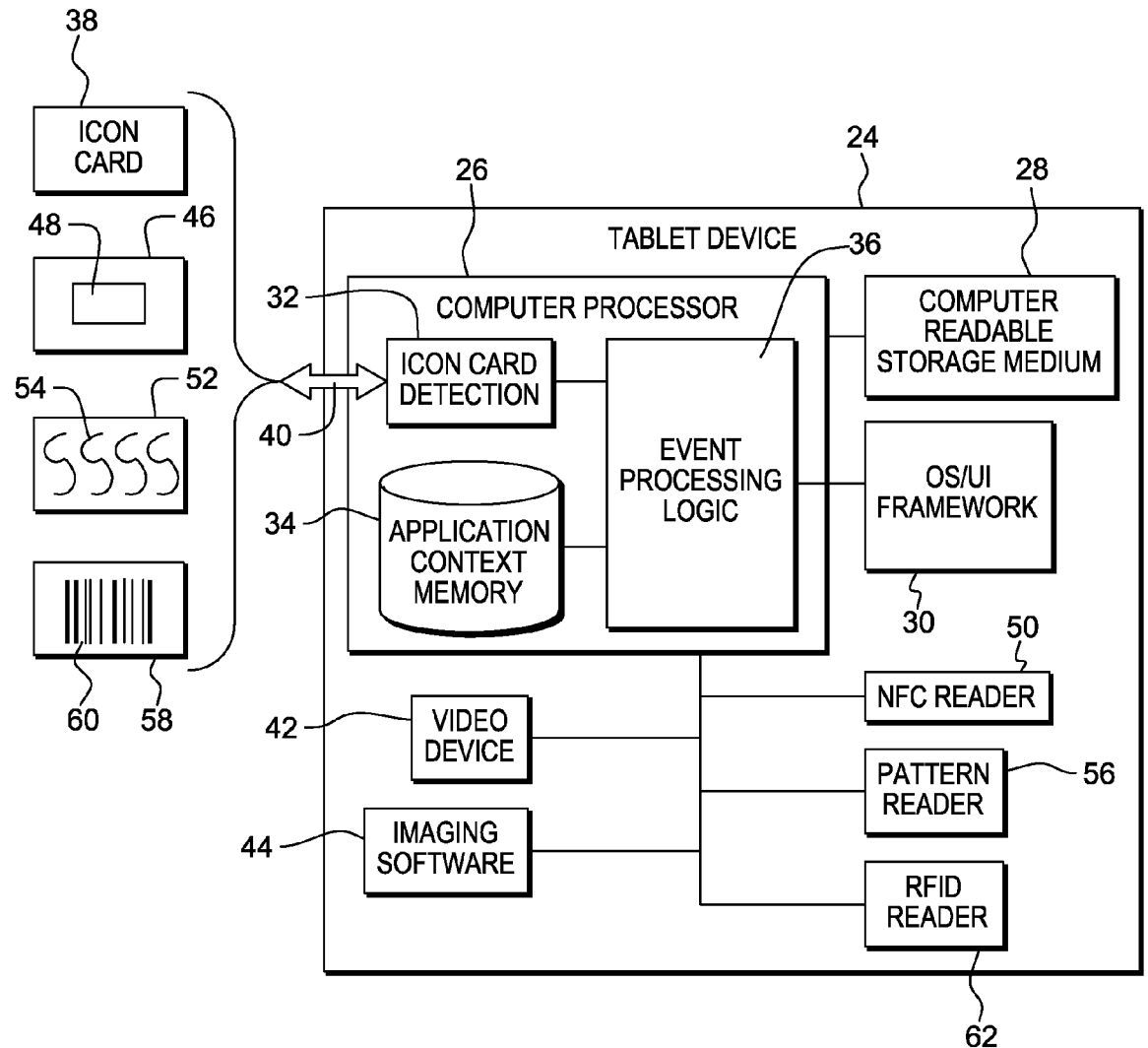
FIG. 6 is another hardware environment for use in practicing the exemplary embodiments.

Referring now to FIG. 6, there is illustrated an exemplary hardware layout of tablet device 24 which provides the environment for the various methods for detecting icon cards.

The icon card detection module 32 may detect 40 the approaching of an icon card (38, for example) to the tablet device 24, identifies which one of a plurality of icon cards is now approaching the tablet device 24, and then notifies the detected/identified icon card 38 to the event processing logic module 36.

A number of methods may be used for icon card detection and icon card identification.

In one exemplary embodiment, detection and recognition of icon card 38 may be made from the shape of the icon card 38 and possibly also the color of the icon card by the use of a video device 42 (such as a camera embodied within the tablet device 24) and imaging software 44. For example, the entire body of the icon card 38 or a frame part thereof may be colored. A video device 42 may be mounted on the back of the tablet device 24. A specific shape of the icon card 38 (for example, a rectangle with an aspect ratio of 1:2) may be detected on the basis of an image captured by using the video device 42 and processed by imaging software 44 using an existing image processing algorithm. When the icon card 38 is in proximity to the tablet device 24, the icon card 38 may be recognized by its shape and color. The icon card 38 may have also a unique identification number which may be learned based on the shape and color of the icon card 38. This unique identification number may be used for the icon card 38 to correspond with a certain computer application. Further, the surface of the icon card 38 may be coated with enamel or a similar coating substance so that a user may write some information on the coated surface.

In another exemplary embodiment, icon card 46 may be detected 40 by using near-field (short-distance) communication. A semiconductor near-field communication chip 48 that is in conformity with a non-contact communication (close coupling integrated communication) scheme may be embedded in icon card 46. Tablet device 24 may be provided with a built-in near-field communication reader 50 to recognize the icon card 46.

In another exemplary embodiment, the icon card 52 may be detected by pattern recognition. The icon card 52 may have a pattern 54 similar to fingerprints that have been printed on the surface of each icon card 52 in advance. A pattern reader 56, such as a fingerprint reader, may be used to read the icon card pattern 54.

In another exemplary embodiment, the icon card 58 may be detected by RFID (radio frequency identification) technology. Icon card 58 may have an RFID pattern 60 printed on or adhered to the icon card 58. The RFID pattern 60 may be recognized by an RFID reader 62 in the tablet device 24. The RFID pattern 60 corresponds with a certain computer application that may be identified by the RFID reader 62.

It should be understood that the above methods of detecting an icon card 38, 46, 52, 58 are only for purposes of illustration and not limitation and other methods not mentioned may be used for detecting an icon card. In addition, one, some or all of these methods may be incorporated into tablet device 24 and that tablet device 24 illustrated in FIG. 6 incorporating all of the above methods is for the purpose of illustration and not limitation.

The identification of the last icon card held in proximity to tablet device 24, such as by placing the tablet device 24 over the icon card or moving the icon card near the tablet device 24, is stored in the memory of the event processing logic module 36.

Figure 7:
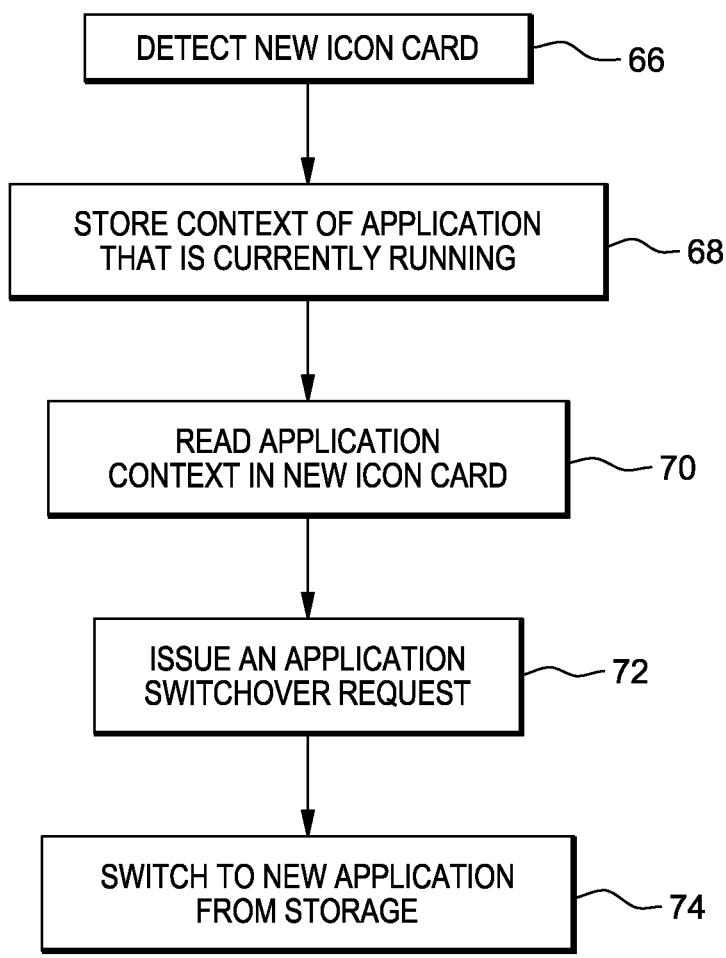
FIG. 7 is a flow chart illustrating a method of the exemplary embodiments.

Referring now to FIG. 7, there is described a method for detecting a new icon card and switching over to the certain application corresponding to the new icon card. The icon card detection module 32 detects a new icon card held in the proximity of the tablet device 24, box 66 of FIG. 7.

Thereafter, the event processing logic module 36 may perform a series of processes illustrated in FIG. 7.

The context information of an application that is currently running on computer processor 26 may be acquired from the framework of a user interface or operating system 30. The acquired information is stored into the application context memory module 34, box 68 of FIG. 7. In this context memory process, the identification of the old icon card (corresponding to the application that is currently running) may be used as a key. The term "context information of an application" means information that is necessary for returning a focus to an application that is currently inactive to make it active. For example, the process identification of an inactive application may be used as the application context information. As another example, the internal state of an application may be subjected to marshaling (i.e., the process of transforming the memory representation of an object to a data format suitable for storage or transmission) to put it out as the application context information.

Next, as indicated in box 70 of FIG. 7, application context that is associated with the identification of the new icon card held in proximity of the tablet device is read and stored in the application context memory module 34.

The application context that is associated with the new icon card may be acquired from the application context memory module 34. A request may be made by the event processing logic module 36 to the operating system 30 to switch applications to the new application corresponding to the new icon card, box 72.

Thereafter, the operating system 30 retrieves the new application from the computer readable storage medium 28 and displays the new application on the screen of the tablet device 24.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A desktop metaphor system comprising:
   a plurality of different types of physical, non-virtual icon cards corresponding to a plurality of computer applications; and
   a computer separate from the plurality of icon cards comprising:
      a non-transitory computer readable storage medium for storing the plurality of computer applications; and
      a computer processor, the computer processor having:
         an icon detection module to automatically detect the approaching of one of the plurality of icon cards to the computer, identify the type of detected icon card approaching the computer of the plurality of different types of icon cards, notify an event processing logic module of the detected/identified icon card and recognize the computer application corresponding to the detected/identified icon card;
         an application context memory module for storing application context for an application running on the computer processor and for storing application context for the application corresponding to the detected/identified icon card and stored in storage; and
         the event processing logic module for switching between the application currently running on the computer processor and the application corresponding to the detected/identified icon card.

2. The desktop metaphor of claim 1 wherein the event processing logic module directs the application context memory to store the application context for the application running on the computer processor and to store the application context for the application corresponding to the detected/identified icon card.

3. The desktop metaphor system of claim 1 wherein the computer is selected from the group consisting of tablets and sub-notebook computers.

4. The desktop metaphor system of claim 1 wherein the detected/identified icon card has a defined shape and color and the computer further comprising a video device and imaging software such that the video device captures an image of the detected/identified icon card and the imaging software processes the image to match the defined shape and color of the detected/identified icon card with the computer application.

5. The desktop metaphor system of claim 1 wherein the detected/identified icon card has a near-field communication semiconductor device and the computer further comprising a near-field communication reader to recognize the detected/identified icon card when in proximity to the computer.

6. The desktop metaphor system of claim 1 wherein the detected/identified icon card has a pattern printed on the detected/identified icon card and the computer further comprising a pattern reader to recognize the printed pattern when in proximity to the computer.

7. The desktop metaphor system of claim 1 wherein the detected/identified icon card has an RFID pattern and the computer further comprising an RFID reader to recognize the RFID pattern when in proximity to the computer.

8. A desktop metaphor system comprising:
   a computer having the capability to communicate with a plurality of different types of physical, non-virtual icon cards corresponding to a plurality of computer applications and being separate from the computer comprising:
      a non-transitory computer readable storage medium for storing the plurality of computer applications; and
      a computer processor, the computer processor having:
         an icon detection module to automatically detect the approaching of one of the plurality of icon cards to the computer, identify the type of detected icon card approaching the computer of the plurality of different types of icon cards, notify an event processing logic module of the detected/identified icon card and recognize the computer application corresponding to the icon card;
         an application context memory module for storing application context for an application running on the computer processor and for storing application context for the application corresponding to the detected/identified icon card and stored in storage; and
         the event processing logic module for switching between the application currently running on the computer processor and the application corresponding to the detected/identified icon card.

9. The desktop metaphor of claim 8 wherein the event processing logic module directs the application context memory to store the application context for the application running on the computer processor and to store the application context for the application corresponding to the detected/identified icon card.

10. The desktop metaphor system of claim 8 wherein the computer is selected from the group consisting of tablets and sub-notebook computers.

11. The desktop metaphor system of claim 8 wherein the computer further comprising a video device and imaging software such that the video device captures an image of the detected/identified icon card and the imaging software processes the image to match a defined shape and color of the detected/identified icon card with the computer application.

12. The desktop metaphor system of claim 8 wherein the computer further comprising a near-field communication reader to recognize the detected/identified icon card when in proximity to the computer.

13. The desktop metaphor system of claim 8 wherein the computer further comprising a pattern reader to recognize a printed pattern on the detected/identified icon card when in proximity to the computer.

14. The desktop metaphor system of claim 8 wherein the computer further comprising an RFID reader to recognize an RFID pattern on the detected/identified icon card when in proximity to the computer.

15. A method for realizing a desktop metaphor on a computer, the method comprising:
   providing a computer having an icon detection module, an application context memory module, an event processing logic module and a non-transitory computer storage medium;
   automatically detecting by the icon detection module the approaching of an icon card to the computer, the icon card corresponding to a certain computer application stored in the non-transitory computer storage medium, the icon card being one of a plurality of different types of physical, non-virtual icon cards corresponding to a plurality of computer applications;

identifying the type of detected icon card approaching the computer of the plurality of different types of icon cards;

notifying the event processing logic module of the detected/identified icon card;

recognizing the certain computer application corresponding to the detected/identified icon card;

directing by the event processing logic module the storing, in the application context memory module, of the application context with respect to an application running on the computer;

directing by the event processing logic module the storing, in the application context memory module, of the application context with respect to the certain computer application corresponding to the detected/identified icon card; and switching by the event processing logic between the application, if any, currently running on the computer and the certain application corresponding to the detected/identified icon card and being stored in the non-transitory computer readable medium.

16. The method of claim 15 wherein the computer is selected from the group consisting of tablets and sub-notebook computers.

17. The method of claim 15 wherein the computer further comprising a video device and imaging software and detecting by the icon detection module further comprising capturing an image of the detected/identified icon card by the video device and processing the image by the imaging software to match a defined shape and a color of the detected/identified icon card corresponding to the computer application.

18. The method of claim 15 wherein the computer further comprising a near-field communication reader and detecting by the icon detection module further comprising recognizing by the near field communication reader the detected/identified icon card the icon card when in proximity to the computer.

19. The method of claim 15 wherein the computer further comprising a pattern reader and detecting by the icon detection module further comprising recognizing by the pattern reader a printed pattern on the detected/identified icon card when the detected/identified icon card is in proximity to the computer.

20. The method of claim 15 wherein the computer further comprising an RFID reader and detecting by the icon detection module further comprising recognizing by the RFID reader an RFID pattern on the detected/identified icon card when in proximity to the computer.

21. A computer program product for realizing a desktop metaphor on a computer, the computer program product comprising:

a non-transitory computer readable storage medium having computer readable program code embodied therewith, the computer readable program code comprising:

computer readable program code configured to provide an icon detection module, an application context memory module, an event processing logic module and a non-transitory computer storage medium;

computer readable program code configured to automatically detect by the icon detection module the approaching of an icon card to the computer, the icon card corresponding to a certain computer application stored in the non-transitory computer storage medium, the physical, non-virtual icon card being one of a plurality of different types of physical, non-virtual icon cards corresponding to a plurality of computer applications;

computer readable program code configured to identify the type of detected icon card approaching the computer of the plurality of different types of icon cards;

computer readable program code configured to notify the event processing logic module of the detected/identified icon card;

computer readable program code configured to recognize the certain computer application corresponding to the icon card;

computer readable program code configured to direct by the event processing logic module the storing, in the application context memory module, of the application context with respect to an application running on the computer;

computer readable program code configured to direct by the event processing logic module the storing, in the application context memory module, of the application context with respect to the certain computer application corresponding to the detected/identified icon card; and computer readable program code configured to switch by the event processing logic between the application, if any, currently running on the computer and the certain application corresponding to the detected/identified icon card and being stored in the non-transitory computer readable medium.

* * * * *